US010541901B2

(12) United States Patent
Raney

(10) Patent No.: US 10,541,901 B2
(45) Date of Patent: Jan. 21, 2020

(54) METHODS, SYSTEMS AND COMPUTER READABLE MEDIA FOR OPTIMIZING PLACEMENT OF VIRTUAL NETWORK VISIBILITY COMPONENTS

(71) Applicant: Keysight Technologies Singapore (Sales) Pte. Ltd., Singapore (SG)

(72) Inventor: Kristopher Len Raney, Oak Park, CA (US)

(73) Assignee: Keysight Technologies Singapore (Sales) Pte. Ltd., Singapore (SG)

( * ) Notice: Subject to any disclaimer, the term of this patent is extended or adjusted under 35 U.S.C. 154(b) by 54 days.

(21) Appl. No.: 15/709,433

(22) Filed: Sep. 19, 2017

(65) Prior Publication Data

US 2019/0089617 A1    Mar. 21, 2019

(51) Int. Cl.
*G06F 15/16* (2006.01)
*H04L 12/26* (2006.01)
*H04L 12/24* (2006.01)

(52) U.S. Cl.
CPC .......... *H04L 43/12* (2013.01); *H04L 41/0823* (2013.01); *H04L 41/147* (2013.01); *H04L 43/087* (2013.01)

(58) Field of Classification Search
CPC ... H04L 41/0823; H04L 41/147; H04L 43/12; H04L 43/087
USPC ......................................................... 709/221
See application file for complete search history.

(56) References Cited

U.S. PATENT DOCUMENTS

| 8,612,599 | B2 | 12/2013 | Tung et al. |
| 8,656,006 | B2 | 2/2014 | Cobb et al. |
| 9,110,703 | B2 | 8/2015 | Santos et al. |
| 9,154,327 | B1* | 10/2015 | Marino .................. G06Q 30/04 |
| 9,471,463 | B1* | 10/2016 | Bates ..................... G06F 11/362 |
| 9,680,728 | B2 | 6/2017 | Besser |
| 10,178,003 | B2 | 1/2019 | Raney et al. |
| 2006/0028999 | A1 | 2/2006 | Iakobashvili et al. |
| 2006/0075093 | A1 | 4/2006 | Frattura et al. |
| 2011/0004698 | A1 | 1/2011 | Wu |
| 2011/0231552 | A1 | 9/2011 | Carter et al. |

(Continued)

OTHER PUBLICATIONS

Commonly-assigned, co-pending U.S. Appl. No. 16/251,019 for "Methods, Systems and Computer Readable Media for Triggering On-Demand Dynamic Activation of Cloud-Based Network Visibility Tools," (Unpublished, filed Jan. 17, 2019).

(Continued)

*Primary Examiner* — S M A Rahman

(57) ABSTRACT

A method for optimizing placement of virtual network visibility components includes providing a virtual network monitoring tap instance for copying packets in a network. The method further includes providing a virtual network packet broker instance for receiving and distributing the copied packets to at least one network monitoring tool instance. The method further includes analyzing a network performance or utilization parameter associated with transmission of the copied packets among the virtual network tap instance, the virtual network packet broker instance and the network monitoring tool instance. The method further includes modifying, based on results of the analyzing, placement of at least one of the virtual network packet broker instance and the virtual network monitoring tool instance.

17 Claims, 13 Drawing Sheets

(56) References Cited

U.S. PATENT DOCUMENTS

| | | |
|---|---|---|
| 2011/0307889 A1 | 12/2011 | Moriki et al. |
| 2012/0079480 A1 | 3/2012 | Liu |
| 2012/0185913 A1 | 7/2012 | Martinez et al. |
| 2012/0210318 A1 | 8/2012 | Sanghvi et al. |
| 2013/0031233 A1 | 1/2013 | Feng et al. |
| 2013/0291109 A1 | 10/2013 | Staniford et al. |
| 2014/0006597 A1* | 1/2014 | Ganguli ............... G06F 9/5072 709/224 |
| 2014/0026122 A1 | 1/2014 | Markande et al. |
| 2014/0047272 A1 | 2/2014 | Breternitz et al. |
| 2014/0180664 A1 | 6/2014 | Kochunni et al. |
| 2014/0215443 A1 | 7/2014 | Voccio et al. |
| 2014/0229605 A1 | 8/2014 | Besser |
| 2014/0278623 A1 | 9/2014 | Martinez et al. |
| 2014/0278808 A1 | 9/2014 | Iyoob et al. |
| 2015/0263889 A1 | 9/2015 | Newton |
| 2015/0319030 A1 | 11/2015 | Nachum |
| 2016/0094418 A1* | 3/2016 | Raney ................... H04L 43/028 370/241 |
| 2016/0094668 A1 | 3/2016 | Chang et al. |
| 2016/0110211 A1 | 4/2016 | Karnes |
| 2016/0269482 A1 | 9/2016 | Jamjoom et al. |
| 2016/0359888 A1 | 12/2016 | Gupta et al. |
| 2016/0364307 A1 | 12/2016 | Garg et al. |
| 2017/0099195 A1 | 4/2017 | Raney |
| 2017/0118102 A1 | 4/2017 | Majumder et al. |
| 2017/0163510 A1 | 6/2017 | Arora et al. |
| 2018/0041477 A1* | 2/2018 | Shaposhnik ........ G06F 9/45545 |
| 2018/0176106 A1 | 6/2018 | Raney et al. |
| 2019/0109777 A1 | 4/2019 | Mircescu |
| 2019/0238422 A1 | 8/2019 | Raney |
| 2019/0260651 A1 | 8/2019 | Raney et al. |

OTHER PUBLICATIONS

Commonly-assigned, co-pending U.S. Appl. No. 16/219,888 for "Methods, Systems, and Computer Readable Media for Managing Deployment and Maintenance of Network Tools," (Unpublished, filed Dec. 13, 2018).

Notice of Allowance and Fee(s) Due for U.S. Appl. No. 15/379,966 (dated Sep. 5, 2018).

"Kubernetes," Wikipedia, the free encyclopedia, https://en.wikipedia.org/wiki/Kubernetes, pp. 1-6 (Sep. 14, 2017).

"Ixia Flex Tap™," Ixia, Document No. 915-6813-01 Rev B, pp. 1-5 (Oct. 2015).

"Ixia Phantom vTap™ with TapFlow™ Filtering," Ixia, Document No. 915-6805-01 Rev K, pp. 1-4 (Jul. 2015).

"Ixia xFilter™," ixia, Document No. 915-6804-01 Rev E, pp. 1-5 (May 2015).

Hofstede et al., "Flow Monitoring Explained: From Packet Capture to Data Analysis with NetFlow and IPFIX," IEEE Communications Surveys & Tutorials, vol. 16, Issue 4, pp. 2037-2064 (May 12, 2014).

Commonly-assigned, copending U.S. Appl. No. 15/379,966 for "Instance Based Management and Control for VM Platforms in Virtula Processing Environments" (Unpublished, filed Dec. 15, 2016).

"Ixia Cloudlens Private," Ixia, Data Sheet, 915-3736-01-6071 Rev A, pp. 1-15 (Aug. 21, 2017).

"The ABCs of Network Visibility," Ixia, pp. 1-57 (Jul. 5, 2017).

Ex Parte Quayle Action for U.S. Appl. No. 15/379,966 (Jun. 13, 2018).

International Search Report and Written Opinion for International Patent Application Serial No. PCT/US2017/063909 (dated Mar. 1, 2018).

"Amazon Virtual Private Cloud VPC Peering Guide," Amazon Web Services, Inc., pp. 1-61 (2017).

"IXNETWORK® Virtual Edition (VE) Virtualized Network Performance Testing," Ixia, A Keysight Business, Data Sheet, 915-2901-01-7061 Rev A, www.ixiacom.com, pp. 1-14 (Aug. 2017).

"Managed Detection and Response," esentire, Gartner Press Release, pp. 1-11 (Mar. 14, 2017).

Commonly-assigned, co-pending U.S. Appl. No. 15/729,061 for "Methods, Systems, and Computer Readable Media for Testing Virtual Network Components Deployed in Virtual Private Clouds (VPCs)," (Unpublished, filed Oct. 10, 2017).

* cited by examiner

| INGRESS | FILTER | SAMPLE | EGRESS |
|---|---|---|---|
| FROM APP INSTANCE X | SOURCE IP ADDRESS Z | 80% | TOOL INSTANCE 1<br>TOOL INSTANCE 2<br>TOOL INSTANCE 3 |
| | | | |

FIG. 7

| RULE |
|---|
| PLACE vPB INSTANCE SO AS TO MINIMIZE WAN TRAFFIC FLOW RATE BETWEEN AVAILABILITY ZONES |
| PLACE vPB INSTANCE NEAREST TOOL INSTANCE THAT REQUIRES LOWEST LATENCY FEED |
| PLACE vPB INSTANCE SO AS TO MINIMIZE TRAFFIC BETWEEN SUBNET X AND SUBNET Y |

FIG. 8

| ENTITY | TRAFFIC RATE | LOCATION ATTRIBUTE | AVG. JITTER/LATENCY TOLERANCE |
|---|---|---|---|
| TOOL INSTANCE 1 | 1 Gb/s | AVAILABILITY ZONE: 2 | .05ms |
| TOOL INSTANCE 2 | 1 Gb/s | AVAILABILITY ZONE: 2 | .05ms |
| TOOL INSTANCE 3 | 1 Gb/s | AVAILABILITY ZONE: 2 | .05ms |
| APP INSTANCE | 1 Gb/s | AVAILABILITY ZONE: 1 | n/a |

FIG. 9

METHODS, SYSTEMS AND COMPUTER READABLE MEDIA FOR OPTIMIZING PLACEMENT OF VIRTUAL NETWORK VISIBILITY COMPONENTS

TECHNICAL FIELD

The subject matter described herein relates to network tapping and packet brokering. More particularly, the subject matter described herein relates to methods, systems, and computer readable media for optimizing placement of virtual network visibility components.

BACKGROUND

Cloud computing environments distribute processing tasks over a pool of virtualized resources that are potentially geographically distributed within and between data centers and computing resource sites. While such geographic distribution is advantageous from a service resiliency standpoint, it can and does sometimes result in the generation of large volumes of wide area network (WAN) traffic, which transits the cloud infrastructure between the geographically separated physical computing resources that make up the cloud.

One type of processing task that can be geographically distributed is network visibility or monitoring. For example, network taps, which copy packets transmitted over a network, can be virtualized and located in different cloud computing sites. Similarly, network packet brokers, which receive packet copies from network taps and broker the packets to different network monitoring applications or tools can also be virtualized and located in cloud computing sites separate from the cloud computing sites where the virtual taps and the network monitoring applications or tools are located.

One problem that occurs when virtual network taps, virtual network packet brokers, and network monitoring applications are located in different cloud computing sites is that geographically distributed placement of such resources may not be optimal from a bandwidth utilization or performance perspective. For example, if a virtual network packet broker located in one cloud computing site sends a large amount of packets to an application in another cloud computing site, the traffic may consume a correspondingly large amount of WAN bandwidth between the two cloud computing sites. Consuming WAN bandwidth can cause latency in delivering the traffic to the network monitoring tools and applications and can also result in excessive charges for cloud resource utilization. In addition, the performance of the visibility network can be adversely affected by suboptimal placement of virtual network visibility components.

Accordingly, there exists a need for optimizing placement of virtual network visibility components.

SUMMARY

The subject matter described herein includes methods, systems, and computer readable media for optimizing placement of virtual network visibility components. As used herein, the term "virtual network visibility components" includes virtual network taps instance, virtual network packet brokers instance, and virtual network monitoring tool instances. One method for optimizing placement of virtual network visibility components includes providing a virtual network monitoring tap instance for copying packets in a network. The method further includes providing a virtual network packet broker instance for receiving and distributing the copied packets to at least one network monitoring tool instance. The method further includes analyzing a network performance or utilization indicator associated with transmission of the copied packets among the virtual network tap instance, the virtual network packet broker instance and the network monitoring tool instance. The method further includes modifying, based on results of the analyzing, placement of at least one of the virtual network packet broker instance and the virtual network monitoring tool instance.

A system for optimizing placement of virtual network visibility components includes a virtual network monitoring tap instance for copying packets in a network. The system further includes a virtual network packet broker instance for receiving and distributing the copied packets to at least one network monitoring tool instance. The system further includes a network visibility component placement controller including least one processor for analyzing a network performance or utilization parameter associated with transmission of the copied packets among the virtual network tap instance, the virtual network packet broker instance and the network monitoring tool instance and modifying, based on results of the analyzing, placement of at least one of the virtual network packet broker instance and the virtual network monitoring tool instance.

A virtual network visibility component placement controller includes at least one processor and a memory. The controller further includes a virtual network visibility component placement optimizer embodied in the memory and executable by the at least one processor for analyzing a network performance or utilization parameter associated with transmission of the copied packets among a virtual network tap instance, a virtual network packet broker instance and a network monitoring tool instance and modifying, based on results of the analyzing, placement of at least one of the virtual network packet broker instance and the virtual network monitoring tool instance.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 7 is a table illustrating an exemplary network visibility sampling rule;

FIG. 8 is a table illustrating exemplary network visibility component placement rules;

FIG. 9 is a table illustrating exemplary monitored network visibility resource utilization information;

DETAILED DESCRIPTION

Figure 1:
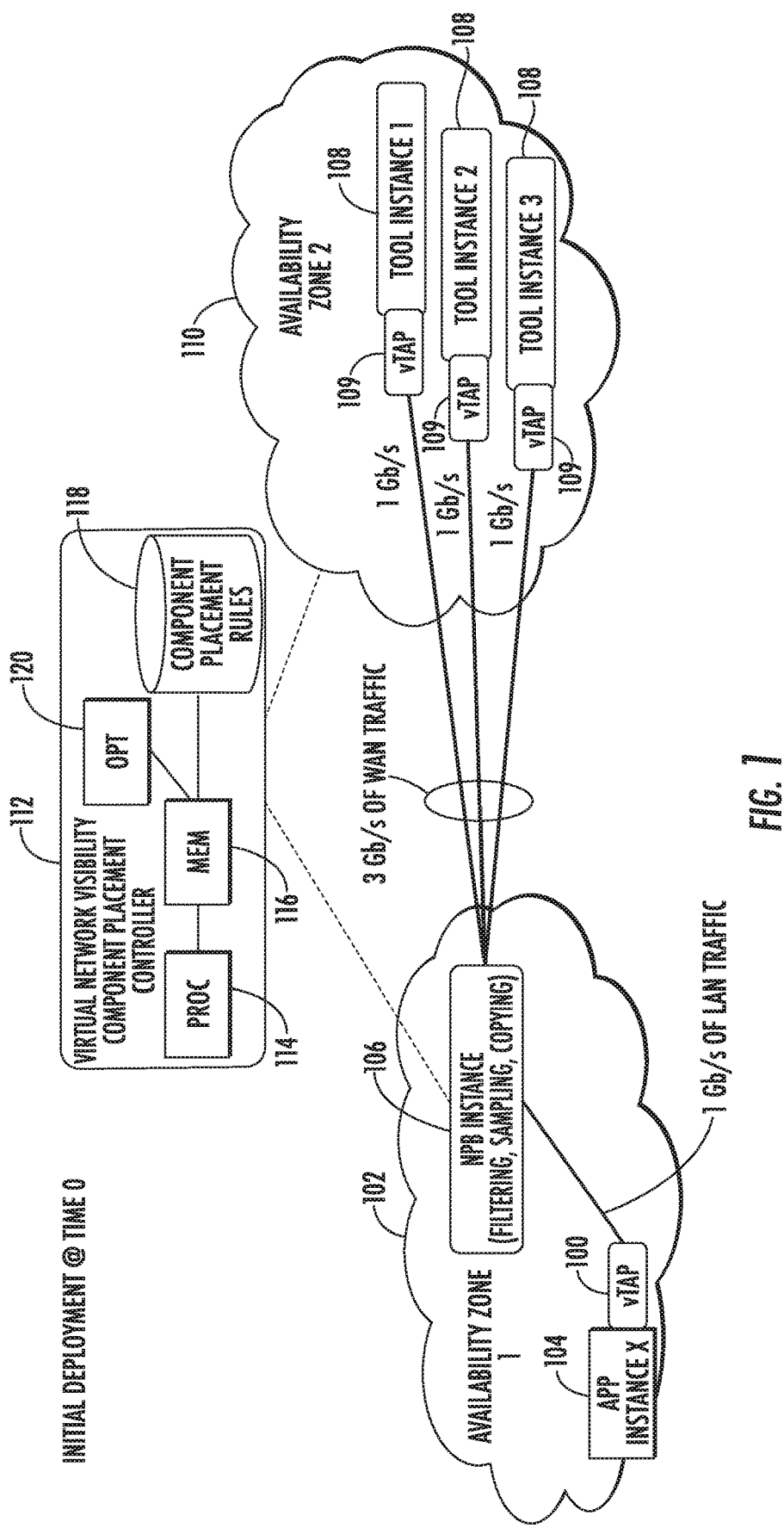
FIG. 1 is a network diagram illustrating an initial deployment of virtual network visibility components.

The subject matter described herein includes methods, systems, and computer readable media for optimizing placements of virtual network visibility components. FIG. 1 is a network diagram illustrating an exemplary initial deployment of network visibility components. Referring to FIG. 1, a virtual network tap instance 100 is located in availability zone 1 102. Virtual network tap instance 100 copies packets from application instance 104. A virtual network packet broker instance 106 is also located in availability zone 1 102. Virtual network packet broker instance 106 receives copied packets from virtual network tap instance 100 and distributes the copied packets to plural virtual network monitoring tool instances 108. In the illustrated example, virtual network monitoring tool instances 108 are located in availability zone 2 110, which is separate from availability zone 1 102.

According to an aspect of the subject matter described herein, a virtual network visibility component placement controller 112 monitors or predicts a network performance or utilization parameter associated with the transmission of copied traffic among virtual network tap instance 100, virtual network packet broker instance 106, and virtual network monitoring tool instances 108 and optimizes placement of one or more of these components based on the network performance or utilization parameter. In one example, virtual network visibility component placement controller 112 may receive actual measurements of network performance parameters relating to copied traffic transmitted between virtual network packet broker instance 106 and virtual network tool instances 108 from virtual taps 109. Virtual network visibility component controller 112 may also receive, from virtual network packet broker instance 106, measurements associated with transmission of traffic between virtual network tap instance 100 and virtual network packet broker instance 106. Examples of network performance parameters associated with the copied traffic that can be measured or predicted include throughput, bandwidth utilization, latency, jitter, or any combination of two or more of these parameters.

Based on these actual measurements, virtual network visibility component placement controller 112 may determine that the placement of virtual network packet broker instance 106 and/or virtual network monitoring tool instances 108 is suboptimal and may change the placement of one or more of these virtual network visibility components. In an alternate example, virtual network visibility component placement controller 112 may predict the flow of traffic between application 104 and virtual network packet broker instance 106 and between network packet broker instance 106 and virtual network monitoring tool instances 108 and make a placement decision based on the predicted volume or other performance or utilization parameter associated with the transmission of copied traffic over the various networks. In yet another implementation, virtual network visibility component controller 112 may use a combination of predicted and actual measurements of copied traffic transmitted between network visibility components when making a placement decision for the network visibility components. Using any combination of predicted and actual measurements is intended to be within the scope of the subject matter described herein.

In the illustrated example, virtual network visibility component placement controller 112 includes a processor 114 and memory 116. Memory 116 may store virtual network visibility component placement rules 118. A virtual network visibility component placement optimizer 120 may execute on processor 114 and optimize placement of one or more network visibility components based on the network visibility placement rules, the monitored or predicted network resource utilization information or performance parameters relating to network visibility, and topology information regarding the network visibility components (i.e., the availability zones in which the components are currently located).

In the illustrated example, virtual network visibility component placement controller 112 may determine or predict that the copied traffic consumes or will consume one gigabyte per second in availability zone 1 102 between virtual network tap instance 100 and virtual network packet broker instance 106. Virtual network visibility component placement controller 112 may determine or predict that 3 gigabytes per second of WAN bandwidth is or will be consumed between virtual network packet broker instance 106 and virtual network monitoring tool instances 108. Accordingly, virtual network visibility component placement controller 112 may make one or more placement optimization decisions based on such information.

Figure 2:
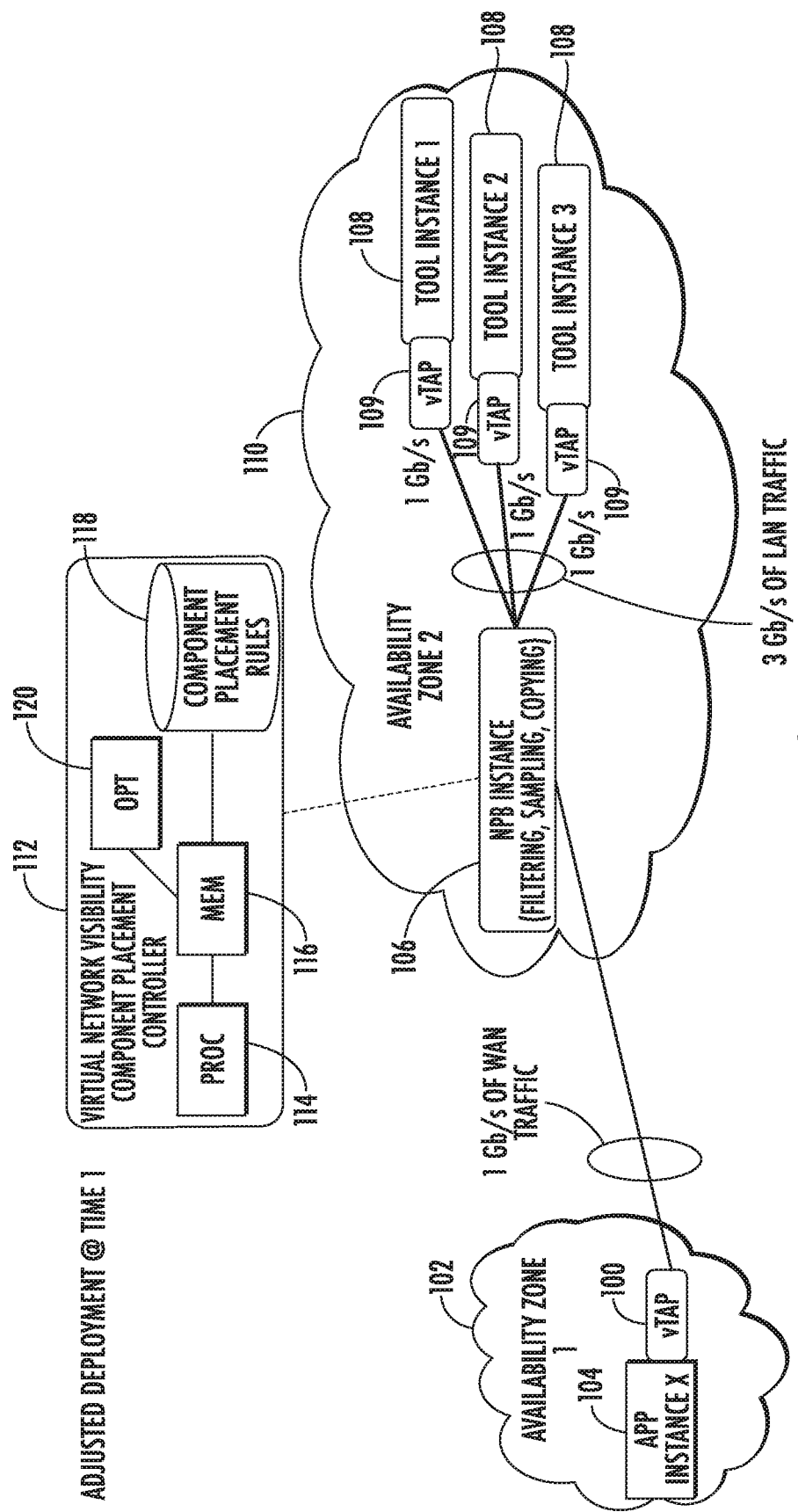
FIG. 2 is a network diagram illustrating an adjusted deployment of the virtual network visibility components in FIG. 1.

FIG. 2 illustrates an example of repositioning of the virtual network visibility components illustrated in FIG. 1 that may be made by virtual network visibility component placement controller 112. In FIG. 2, virtual network visibility component placement controller 112 moves virtual network packet broker instance 106 from availability zone 1 102 to availability zone 2 110. Moving virtual network packet broker instance 106 may include stopping the virtual network packet broker instance 106 in availability zone 1 102 and starting a new virtual network packet broker instance 106 in availability zone 2 110. The result of moving virtual network packet broker instance 106 to availability zone 2 110 is that only one gigabyte per second of WAN bandwidth is consumed between availability zone 1 102 and availability zone 2 110. In availability zone 2 110, three gigabytes per second of LAN bandwidth is consumed by transmission of the copied packets. However, because WAN bandwidth is typically more expensive than LAN bandwidth, the deployment illustrated in FIG. 2 is preferred over the deployment illustrated in FIG. 1.

Figure 3:
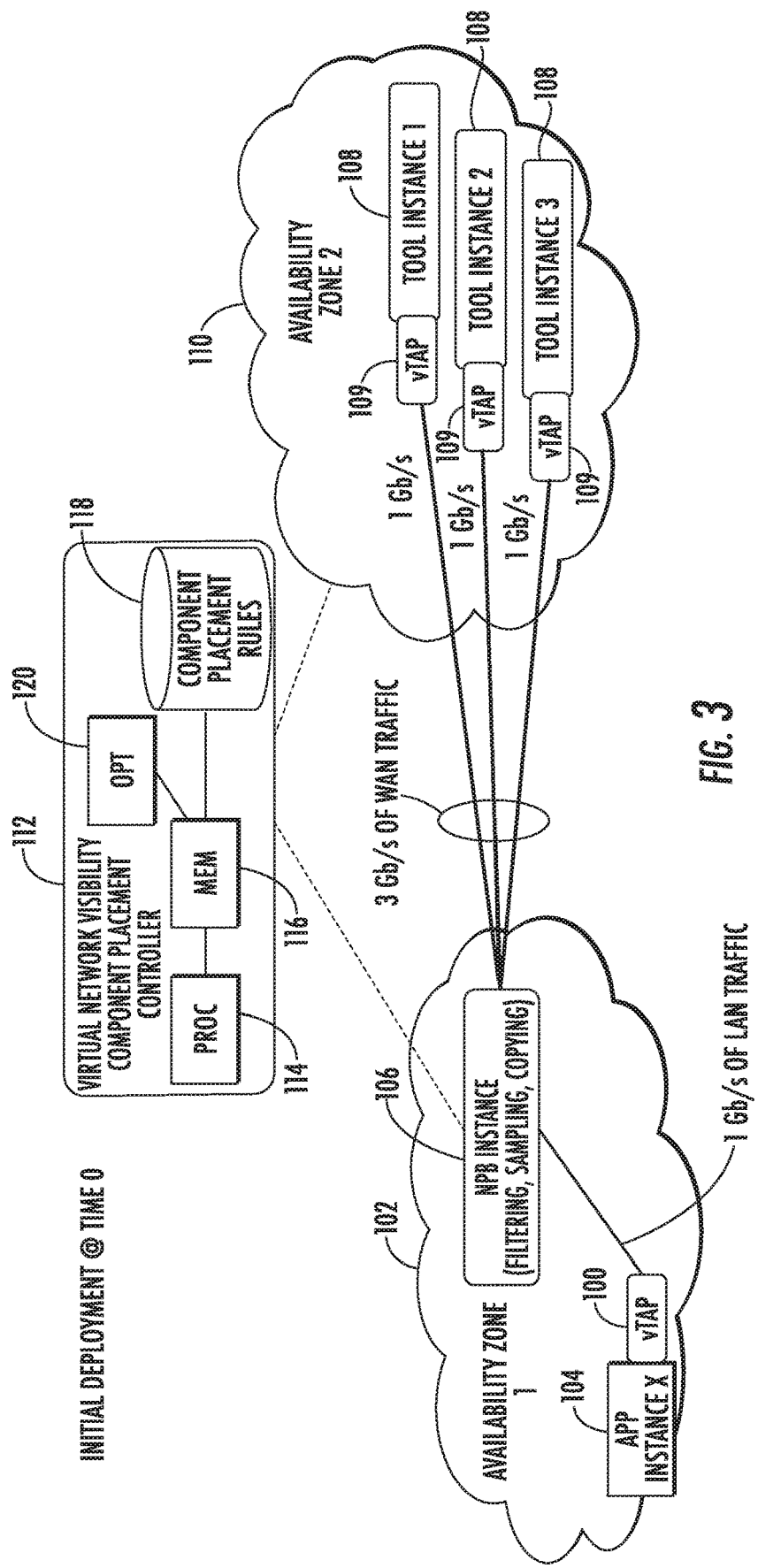
FIG. 3 is a network diagram illustrating an initial deployment of network visibility components.

FIG. 3 is a network diagram illustrating another initial deployment of virtual network visibility components. In FIG. 3, two virtual network tap instances 100 copy packets from two different applications 104 in availability zone 1 102. Virtual network packet broker instance 106 is also located in availability zone 1 102. Two gigabytes per second of LAN bandwidth is consumed between virtual network tap instances 100 and virtual network packet broker instance 106. In availability zone 2 110, three virtual network monitoring tool instances 108 receive copied packets from virtual network packet broker 106. In the illustrated example, one of virtual network monitoring tool instances 108 receives two gigabytes per second of copied packets while the other two network monitoring tool instances each receive one gigabyte per second of copied traffic. The result of transmission of the copied traffic between availability zone 1 102 and availability zone 2 110 is the consumption of four gigabytes per second of WAN bandwidth.

Virtual network visibility component placement controller 112 determines the initial deployment of the network visibility components in FIG. 3, monitors or predicts the resource utilization of the network visibility components and makes one or more virtual network visibility component placement decisions.

Figure 4:
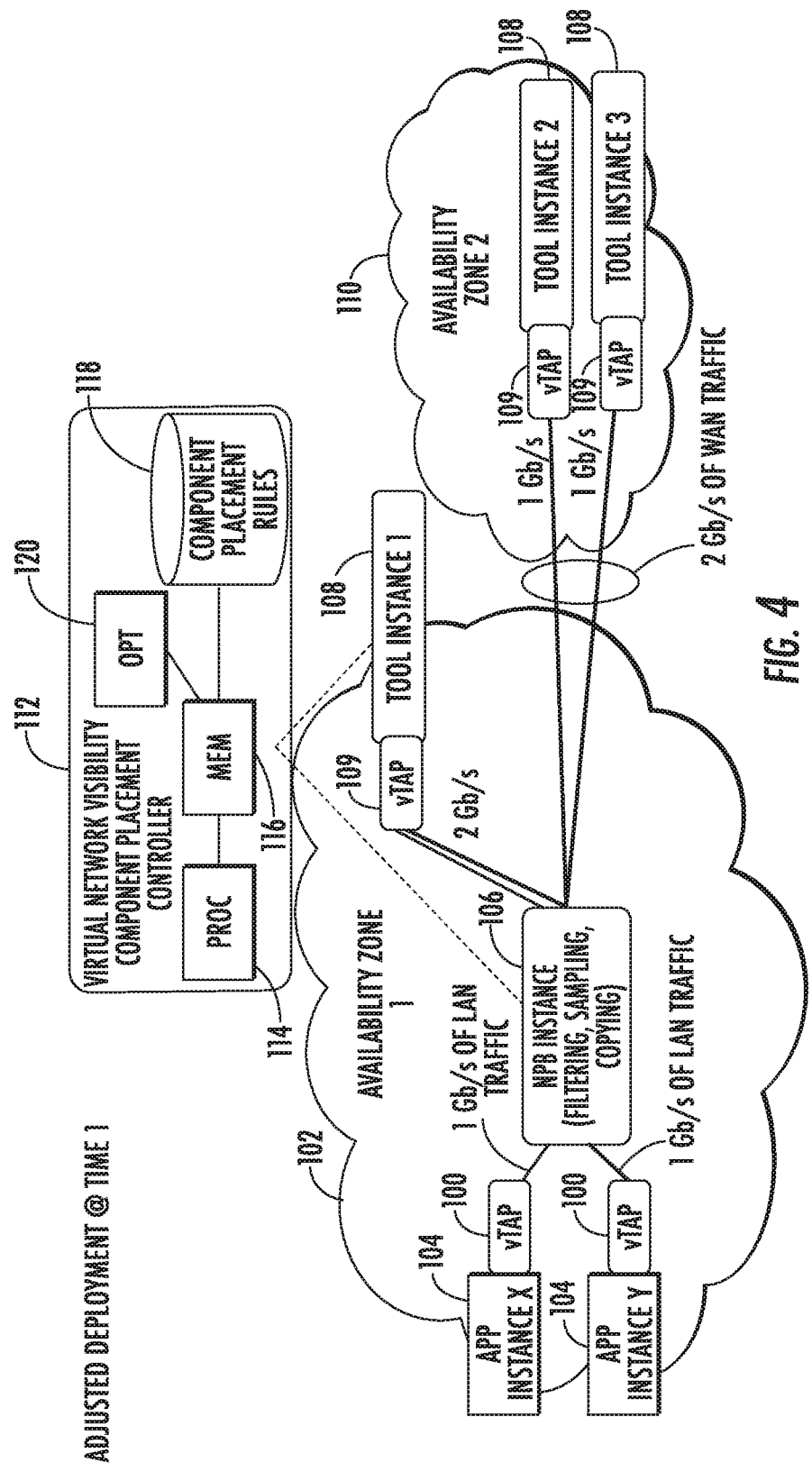
FIG. 4 is a network diagram illustrating an adjusted deployment of the network visibility components illustrated in FIG. 3.

FIG. 4 illustrates an adjusted deployment of the network visibility components illustrated in FIG. 3. In FIG. 4, the virtual network monitoring tool instance 108 that was receiving two gigabytes per second of copied traffic is moved from availability zone 2 110 to availability zone 1 102. Moving a virtual network monitoring tool instance 108 from one availability zone to another availability zone may include halting and deallocating resources for the network monitoring tool instance 108 in the original availability zone, allocating resources for the network monitoring tool instance in the new availability zone, and starting the network monitoring 11 tool instance 108 in the new availability zone. The result of the repositioning in FIG. 4 is that the consumption of WAN bandwidth between availability zone 1 102 and availability zone 2 110 is reduced by 50%.

Figure 5:
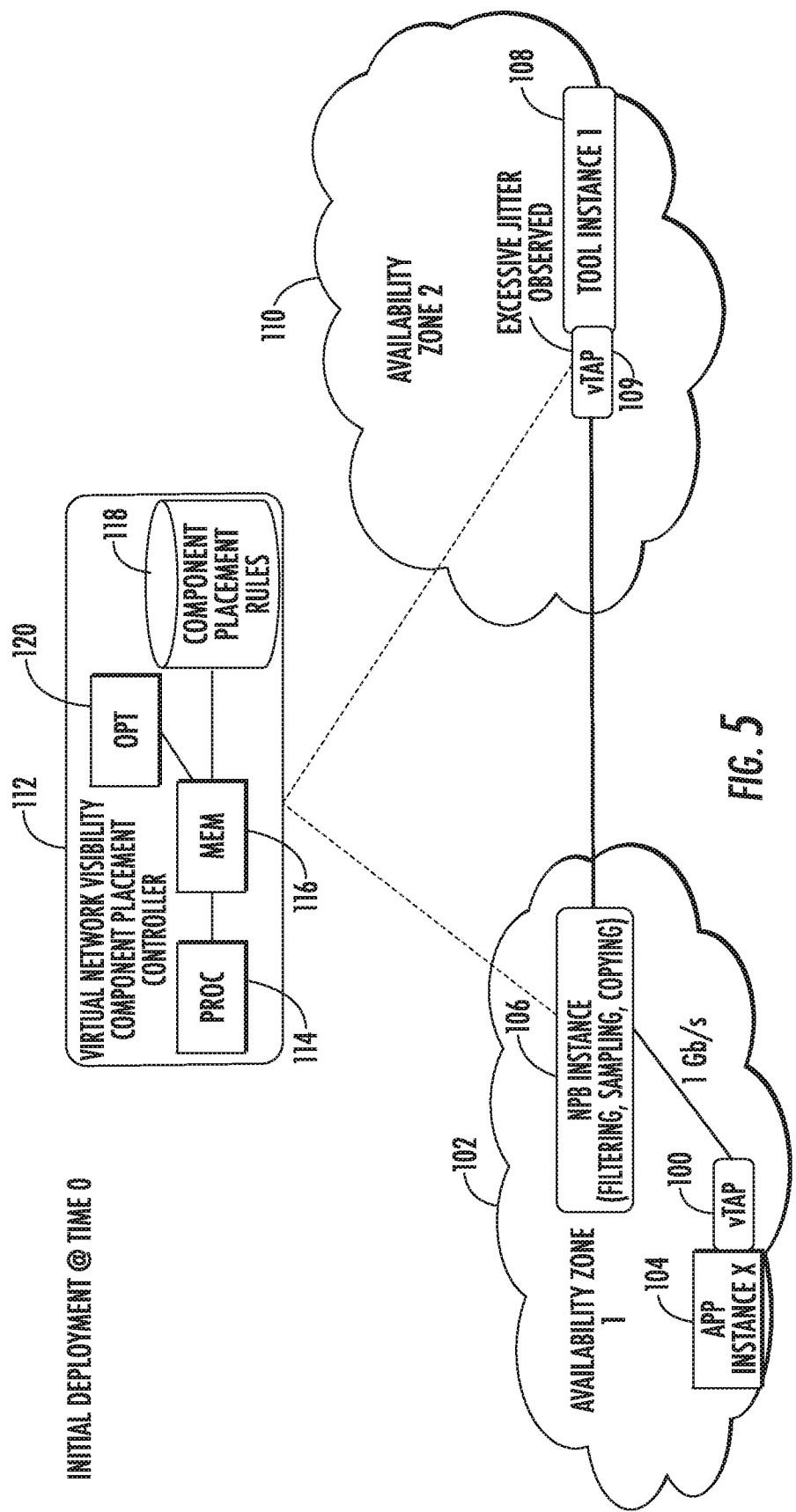
FIG. 5 is a network diagram illustrating an initial deployment of network visibility components.

FIG. 5 is a network diagram illustrating another example of an initial deployment of virtual network visibility components where component the initial placement results in excessive jitter in copied packet traffic. Referring to FIG. 5, virtual network packet broker instance 106 and virtual network tap instance 100 are located in availability zone 1 102. Virtual network monitoring tool instance 108 is located on availability zone 2 110. Virtual network visibility component placement controller 112 monitors copied traffic between availability zone 102 and availability zone 2 110. In the illustrated example, virtual network visibility component placement controller 112 observes jitter in the copied traffic received by network monitoring tool instance 108 that is above a threshold defined in virtual network visibility component placement rules 118.

Figure 6:
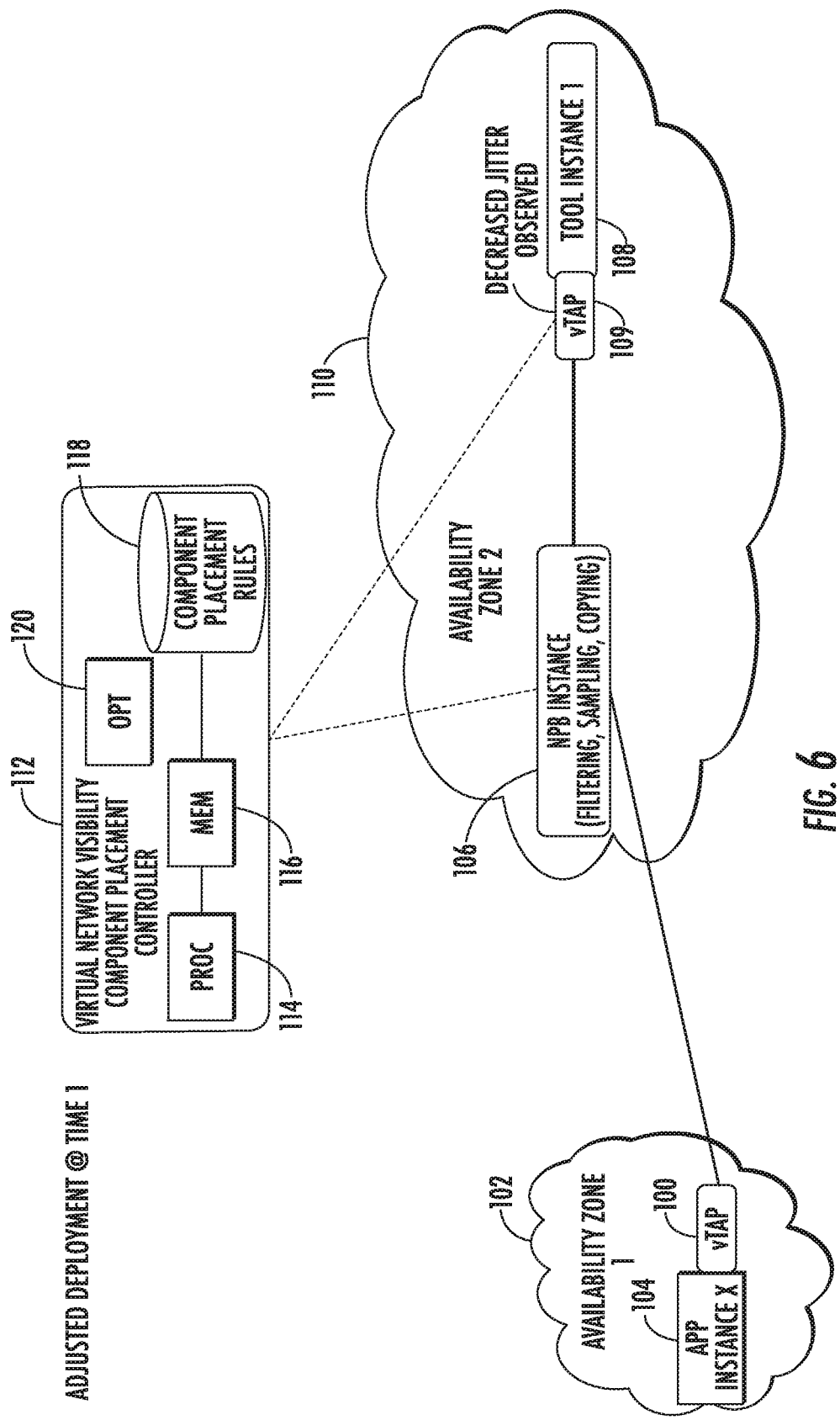
FIG. 6 is a network diagram illustrating an adjusted deployment of the network visibility components illustrated in FIG. 5.

Accordingly, referring to FIG. 6, virtual network visibility component placement controller 112, based on the observed excessive jitter, moves virtual network packet broker instance 106 from availability zone 1 102 to availability zone 2 110. As a result of the movement of virtual network packet broker instance 106, jitter in copied traffic between virtual network packet broker instance 106 and virtual network tool instance 108 is reduced.

In the examples illustrated in FIGS. 5 and 6, jitter in the copied traffic is used as a trigger for repositioning of virtual network visibility components. In an alternate example, latency in the copied traffic may be used as trigger for repositioning of the virtual network visibility components. For example, in FIG. 5, if virtual network visibility component placement controller 112 observes excessive latency in the copied traffic between availability zone 1 102 and availability zone 2 110, virtual network visibility component placement controller 112 may similarly move virtual network packet broker instance 106 to availability zone 2 110.

In one exemplary implementation, virtual network visibility component placement controller 112 may analyze rules implemented by network visibility components in order to predict network resource utilization and make placement decisions. FIG. 7 is a table illustrating an exemplary network visibility rule that may be implemented by virtual network packet broker instance 106. In FIG. 7, the rule indicates that network packet broker 106 will sample 80% of traffic from an application, referred to as application instance X where the traffic has a source IP address of Z. Virtual network packet broker 106 will forward the sampled traffic to three network monitoring tool instances 1-3. Network visibility component placement controller 112 will utilize this information to predict the traffic flow between network visibility components and make placement decisions. For example, if virtual network visibility component placement controller 112 determines, from a network visibility rule, that a particular type of application executes on a mobile device, the traffic flow of that type of application can be predicted. If the same traffic flow is being sent to three different network monitoring tool instances, the volume of traffic transmitted to the network monitoring tool instances can be predicted. Network visibility component placement controller 112 may also determine the topology of a network, such as the fact that virtual network packet broker instance 106 is located in a different availability zone from the network monitoring tool instances. Using the predicted traffic flow and the current topology of a network, network visibility component placement controller 112 may make a placement decision for network visibility components.

As stated above, virtual network visibility component placement controller 112 may utilize one or more virtual network visibility component placement rules 118 to control placement of network visibility components. FIG. 8 is a table illustrating exemplary network visibility component placement rules. In FIG. 8, the first rule indicates that a virtual packet broker instance may be placed to minimize WAN traffic flow between availability zones. The second rule in FIG. 8 indicates that the virtual network packet broker instance will be placed closest to the tool instance that requires the lowest latency feed. The third rule in FIG. 8 illustrates that the virtual network packet broker instance may be placed to minimize traffic between subsets. Any combination of one or more of these and other network visibility component placement rules described herein may be used by virtual network visibility placement controller 112 without departing from the scope of the subject matter described herein.

As stated above, repositioning or placement of network visibility components may be triggered by resource utilization or performance tolerances exceeding a threshold. FIG. 9 is a table illustrating exemplary latency or jitter tolerances that may be used by virtual network visibility component placement controller 112 in repositioning virtual network visibility components. Referring to FIG. 9, tool instances 1-3 located in availability zone 2 each have a latency or jitter tolerance of 0.05 milliseconds. Location attributes are also stored for the monitored application instance. If any of the latency or jitter tolerances are exceeded or predicted to be exceeded, virtual network visibility component placement controller 112 may trigger repositioning of virtual network packet broker instance 106 and/or network monitoring tool instances 108.

The location attributes illustrated in FIG. 9 may be statically provisioned in virtual network visibility component placement controller 112 or may be learned dynamically by virtual network visibility component placement controller 112. In one example, virtual network visibility component placement controller 112 may query a virtual network resource orchestration controller for the network to determine the locations of virtual network visibility components.

Figure 10:
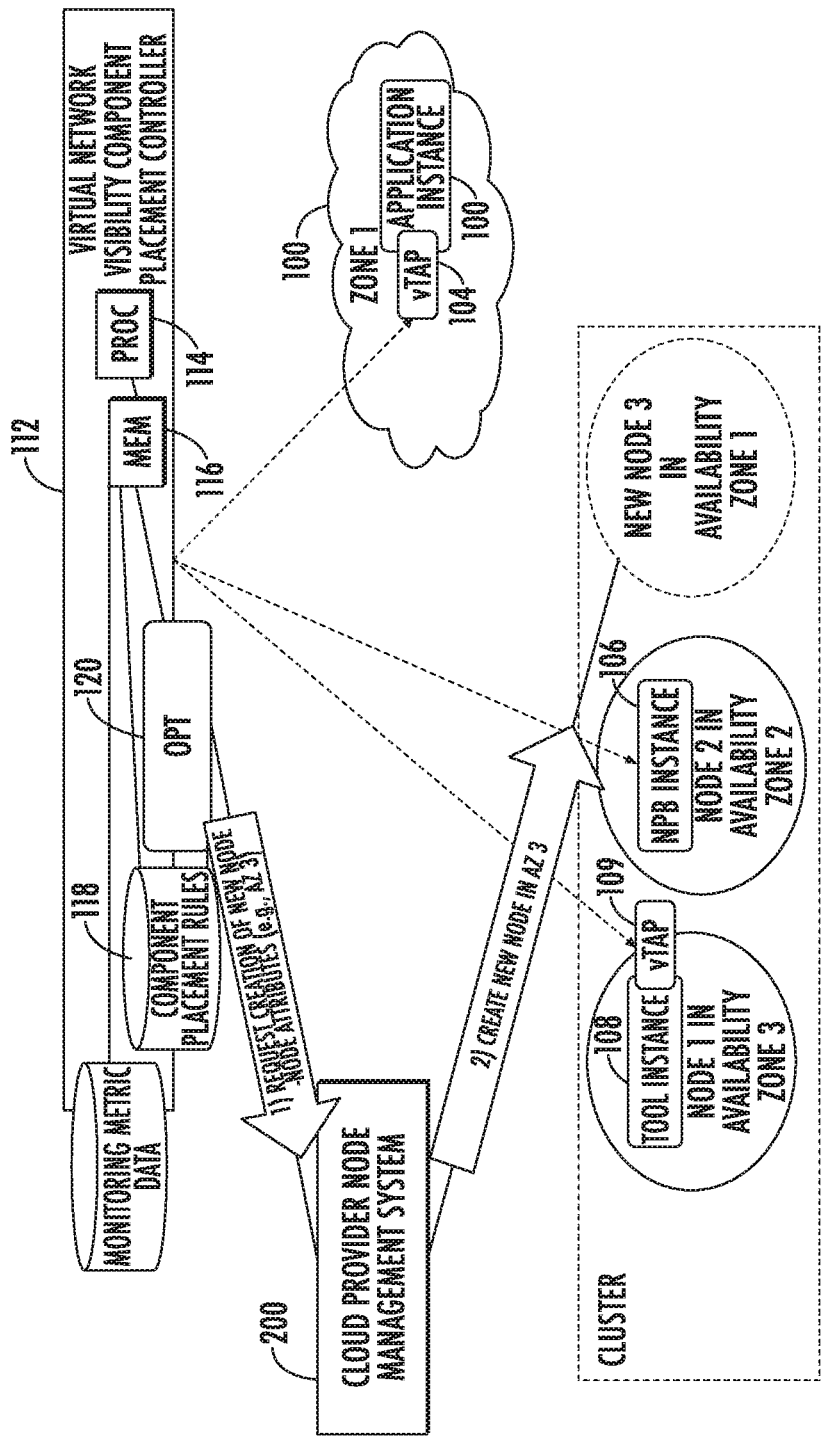
FIG. 10 is a network diagram illustrating instantiation of a node for holding new network visibility component.

In order to optimize placement of virtual network visibility components, virtual network visibility component placement controller 112 may communicate cloud network orchestration components. FIG. 10 illustrates an example of one such component, which is referred to as cloud provider node management system. Before a new virtual network visibility component can be instantiated in a cloud network, resources (virtual and physical) must be allocated in the cloud service provider's network. For example, one cloud service provider requires creation of a node for hosting virtual applications. FIG. 10 illustrates this example. In FIG. 10, virtual network visibility component placement controller 112 sends a request to cloud provider node management system 200 for creation of a new node in availability zone 1. The new node is a virtual partition of cloud resources for hosting applications, such as network visibility components or applications. In response to the request, cloud provider node management system 200 creates a new node 202 in availability zone 1. Because cloud service providers may start metering resources where nodes are created, it is desirable that new nodes be allocated on the fly, as new network visibility components are needed.

Figure 11:
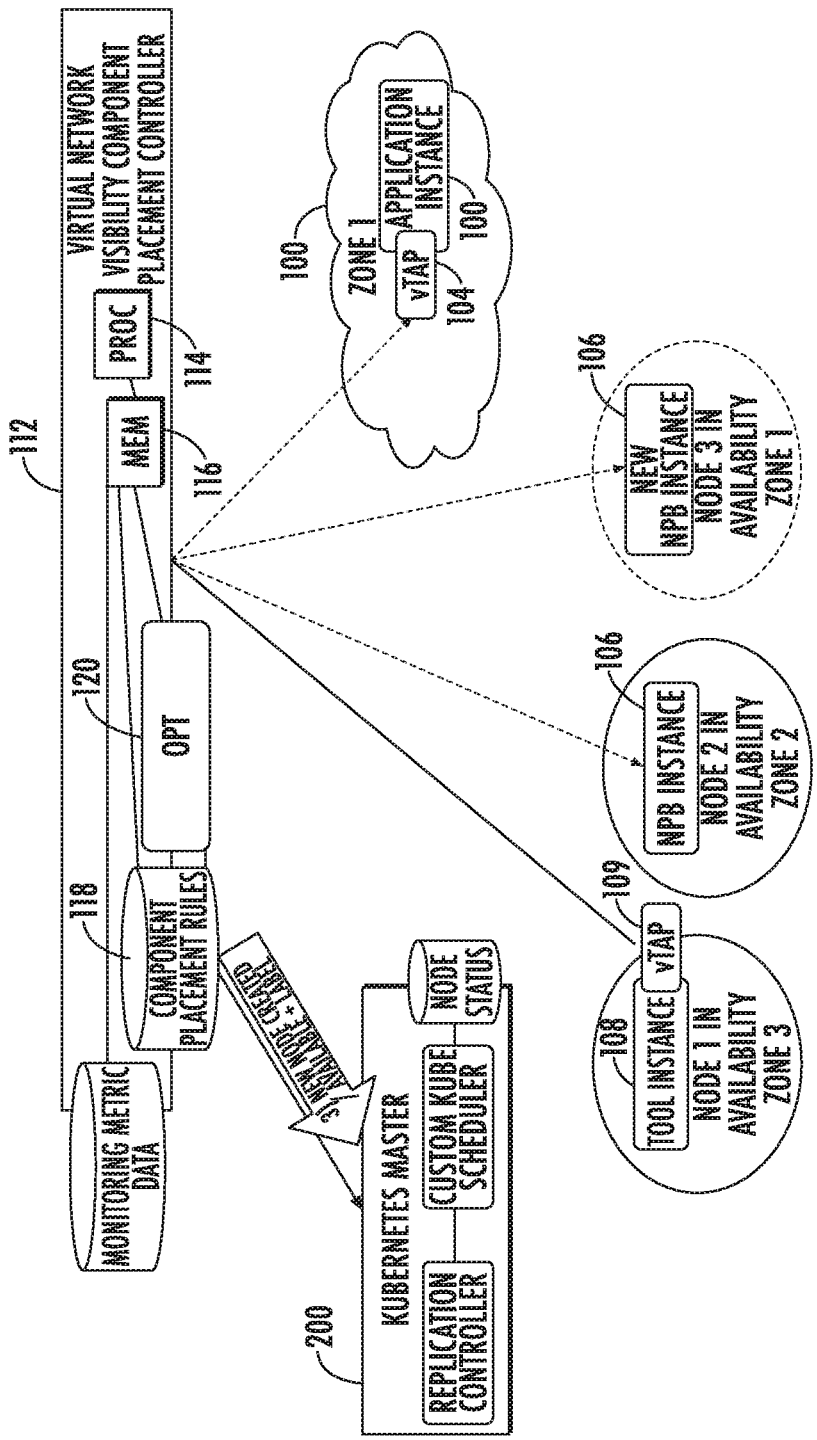
FIG. 11 is a network diagram illustrating notification to an orchestration master of the instantiation of the node in FIG. 10.

After the creation of the new node in availability zone 1, virtual network visibility component placement controller communicates the identity of the new node to an orchestration master. FIG. 11 illustrates such communication. In FIG. 11, virtual network visibility component placement controller 112 communicates the availability and identity of the new node to orchestration master 204, which in the illustrated example is a Kubernetes master. Kubernetes is an open source system for deployment of applications in a computer network. Kubernetes is provided as an example in FIGS. 11 and 12. However, the subject matter described herein is not limited to using Kubernetes to deploy virtual network visibility components. Any system that enables virtual network visibility components to be placed at desired locations, such as in specific availability zones, is intended to be within the scope of the subject matter described herein.

Figure 12:
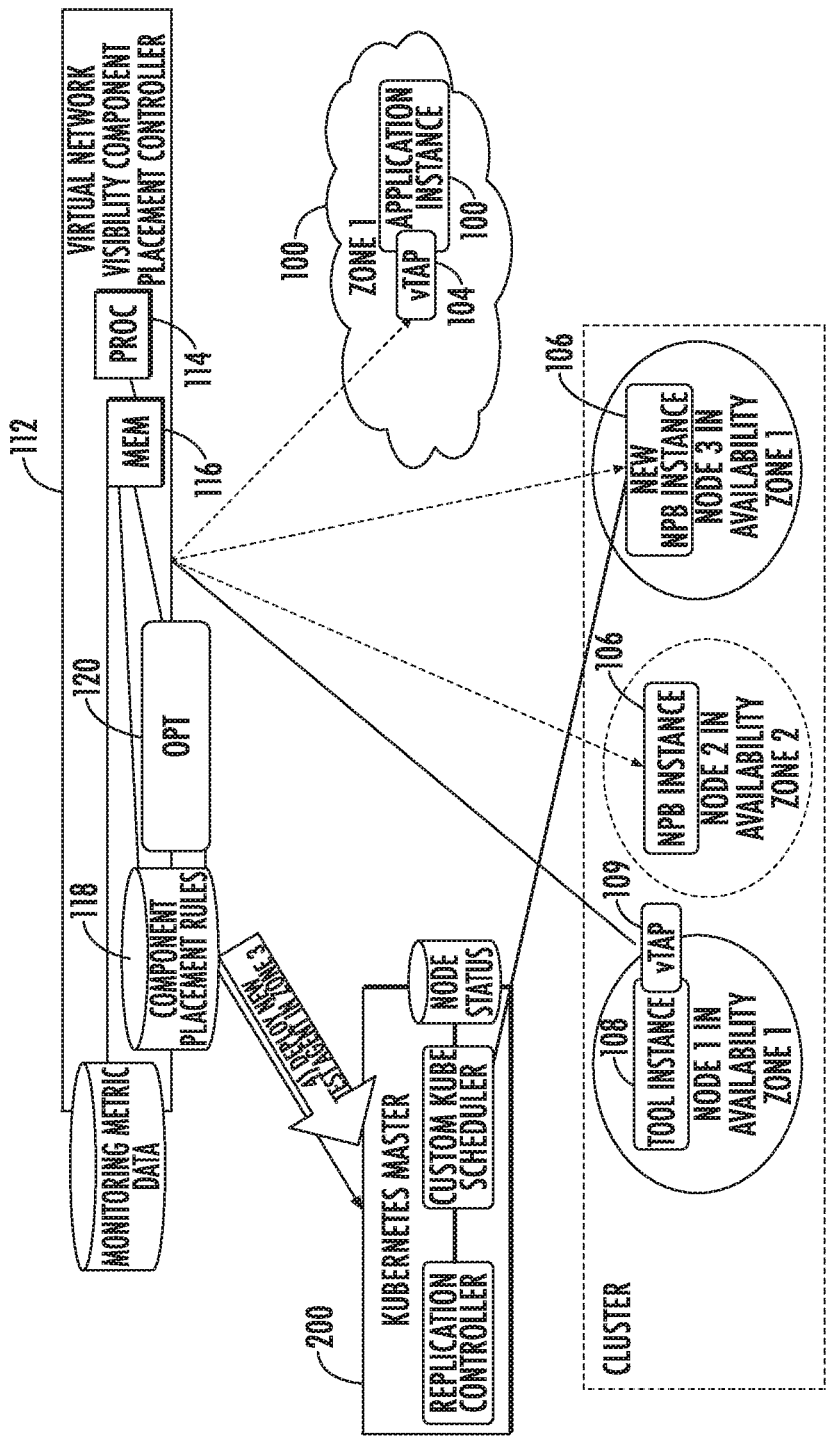
FIG. 12 is a network diagram illustrating exemplary instantiation of a new virtual network packet broker on the node created in FIG. 10.

Once orchestration master 204 is provisioned with the identity and availability of new node 202, virtual network visibility component placement controller 112 instructs orchestration master 204 to provision a new network visibility component on the new node. This communication is illustrated in FIG. 12. In FIG. 12, virtual network visibility component controller 112 sends a message to orchestration master 204 to deploy a new network packet broker instance in availability zone 1. In response, orchestration master 204 provisions a new network visibility application on node 202 in availability zone 1. In the illustrated example, the new network visibility component is a virtual network packet broker instance 106. If virtual network packet broker instance 106 is being moved from another availability zone, virtual network visibility component controller 112 may instruct orchestration master 204 to deallocate resources for the network packet broker instance in the original availability zone. Virtual network visibility component placement controller 112 may also instruct cloud provider node management system 200 illustrated in FIG. 10 to deallocate resources for the node in the original availability zone if no other applications are using the node. Thus, using the messaging illustrated in FIGS. 10-12, virtual network visibility component placement controller 112 interacts with cloud service provider node and orchestration components to move instances of network visibility components.

Figure 13:
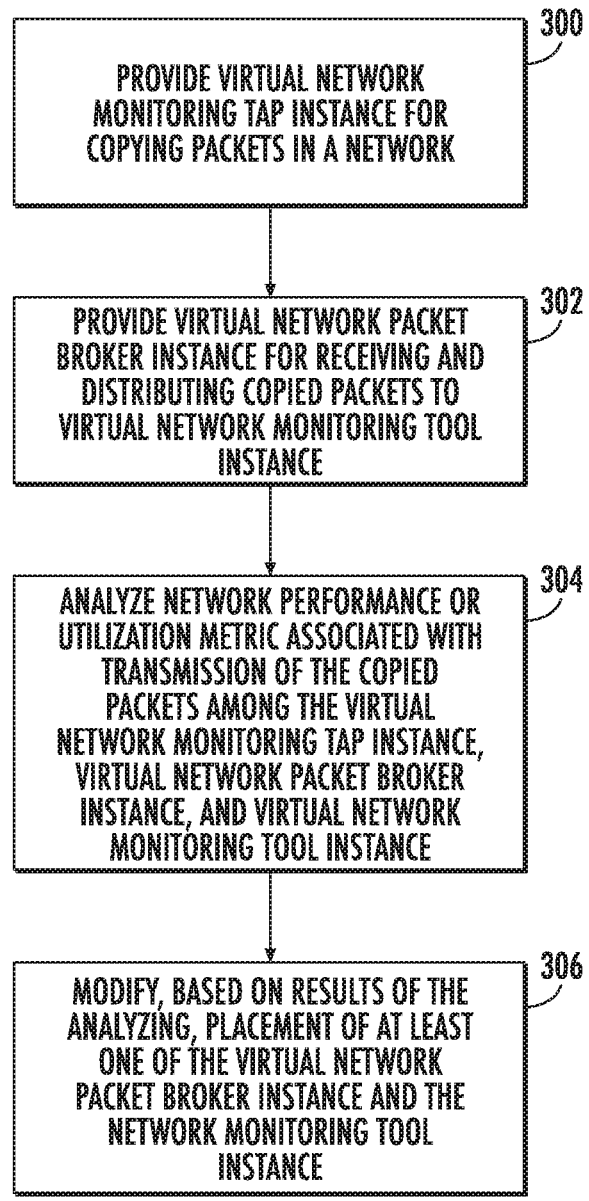
FIG. 13 is a flow chart illustrating an exemplary process for optimizing placement of virtual network visibility components.

FIG. 13 is a flow chart illustrating an exemplary process for optimizing placement of network visibility components. Referring to FIG. 13, in step 300, a virtual network monitoring tap instance is provided for copying packets in a network. Referring to FIG. 1, virtual network tap instance 100 may be located in availability zone 1 102 to monitor packets from application instance 104.

In step 302, a virtual network packet broker instance is provided for receiving and distributing the copied packets to at least one network monitoring tool instance. Referring to FIG. 1, virtual network packet broker instance 106 may be provided to distribute packets from virtual network tap instance 100 to network monitoring tool instances 108.

In step 304, a network performance or utilization parameter associated with the transmission of copied packets among the virtual network tap instance, the virtual network packet broker instance, and the virtual network monitoring tool instance may be analyzed. For example, virtual network visibility component placement controller 112 may analyze actual or predicted LAN bandwidth utilization, jitter, latency, or other performance or utilization parameter associated with the transmission of copied packets over the network. Virtual network visibility component placement controller 112 may determine whether the actual or predicted performance exceeds a threshold.

In step 306, the placement of at least one of the virtual packet broker instance and the virtual network monitoring tool instance is modified based on results of the analyzing in step 304. For example, virtual network visibility component placement controller 112 may move virtual network packet broker instance 106 or any of network monitoring tool instances 108 to different availability zones to decrease LAN bandwidth utilization, jitter, or latency associated with the transmission of copied packets over a network.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for optimizing placement of virtual network visibility components, the method comprising:
  providing a virtual network monitoring tap instance for copying packets in a network;
  providing a virtual network packet broker instance for receiving and distributing the copied packets to at least one network monitoring tool instance located in a first availability zone, wherein providing the virtual network packet broker instance includes providing the virtual network packet broker instance in a second availability zone separate from the first availability zone in which the network monitoring tool instance is located;

analyzing a network performance or utilization parameter associated with transmission of the copied packets among the virtual network tap instance, the virtual network packet broker instance and the network monitoring tool instance, wherein analyzing the performance or utilization parameter associated with transmission of the copied packets includes monitoring or predicting wide area network (WAN) bandwidth utilization by the copied packets between the first and second availability zones; and modifying, based on results of the analyzing, placement of at least one of the virtual network packet broker instance and the virtual network monitoring tool instance, wherein modifying, based on results of the analyzing, placement of one of the virtual network packet broker instance and the virtual network monitoring tool instance includes moving the virtual network packet broker instance so that the virtual network packet broker instance and the virtual network monitoring tool instance are located in the same availability zone, and wherein moving the virtual network packet broker instance includes halting and deallocating resources for the virtual network packet broker instance in the second availability zone and allocating resources for the virtual network packet broker instance in the first availability zone.

2. The method of claim 1 wherein analyzing a network performance or utilization parameter includes analyzing latency or jitter associated with delivery of the copied packets to the virtual network monitoring tool instance and wherein modifying placement of at least one of the virtual network packet broker instance and the virtual network monitoring tool instance includes moving the virtual network packet broker instance so that the virtual network packet broker instance and the virtual network monitoring tool instance are located in the same availability zone in response to the latency or jitter exceeding a threshold.

3. The method of claim 1 wherein analyzing a network performance or utilization parameter associated with transmission of the copied packets includes predicting a network performance or utilization parameter associated with transmission of the copied packets from a network visibility rule implemented by the virtual network packet broker instance.

4. The method of claim 1 wherein analyzing a network performance or utilization parameter includes measuring a network performance parameter associated with transmission of the copied packets.

5. The method of claim 4 wherein measuring the network performance or utilization parameter includes utilizing a virtual network monitoring tap instance co-located with the virtual network monitoring tool instance.

6. The method of claim 1 wherein modifying placement of at least one of the virtual network packet broker instance and the virtual network monitoring tool instance includes communicating with a cloud provider node management system to create a new node for hosting the new virtual network packet broker instance.

7. The method of claim 6 wherein modifying placement of at least one of the virtual network packet broker instance and the virtual network monitoring tool instance includes communicating with an orchestration master to create the new virtual network packet broker instance on the new node.

8. A system for optimizing placement of virtual network visibility components, the system comprising:

a virtual network monitoring tap instance for copying packets in a network;

a virtual network packet broker instance for located in a first availability zone and receiving and distributing the copied packets to at least one network monitoring tool instance located in a second availability zone separate from the first availability zone; and a network visibility component placement controller including at least one processor for analyzing a network performance or utilization parameter associated with transmission of the copied packets among the virtual network tap instance, the virtual network packet broker instance and the network monitoring tool instance, wherein analyzing the performance or utilization parameter associated with transmission of the copied packets includes monitoring or predicting wide area network (WAN) bandwidth utilization by the copied packets between the first and second availability zones, and modifying, based on results of the analyzing, placement of at least one of the virtual network packet broker instance and the virtual network monitoring tool instance, wherein modifying, based on results of the analyzing, placement of one of the virtual network packet broker instance and the virtual network monitoring tool instance includes moving the virtual network packet broker instance so that the virtual network packet broker instance and the virtual network monitoring tool instance are located in the same availability zone, and wherein moving the virtual network packet broker instance includes halting and deallocating resources for the virtual network packet broker instance in the second availability zone and allocating resources for the virtual network packet broker instance in the first availability zone.

9. The system of claim 8 wherein analyzing a network performance or utilization parameter includes analyzing latency or jitter associated with delivery of the copied packets to the virtual network monitoring tool instance and wherein modifying placement of at least one of the virtual network packet broker instance and the virtual network monitoring tool instance includes moving the virtual network packet broker instance so that the virtual network packet broker instance and the virtual network monitoring tool instance are located in the same availability zone in response to the latency or jitter exceeding a threshold.

10. The system of claim 8 wherein analyzing a network performance or utilization parameter associated with transmission of the copied packets includes analyzing a predicted network performance or utilization parameter associated with transmission of the copied packets from a network visibility rule implemented by the virtual network packet broker instance.

11. The system of claim 8 wherein analyzing a network performance or utilization parameter includes analyzing a measured network performance or utilization parameter associated with transmission of the copied packets.

12. The system of claim 11 wherein measuring the network performance or utilization parameter includes utilizing virtual network tap instances co-located with the virtual network monitoring tool instance.

13. The system of claim 8 wherein modifying placement of at least one of the virtual network packet broker instance and the virtual network monitoring tool instance includes communicating with a cloud provider node management system to create a new node for hosting the new virtual network packet broker instance.

14. The system of claim 13 wherein modifying placement of at least one of the virtual network packet broker instance and the virtual network monitoring tool instance includes communicating with an orchestration master to create the new virtual network packet broker instance on the new node.

15. A virtual network visibility component placement controller comprising:
- at least one processor;
- a memory; and
- a virtual network visibility component placement optimizer embodied in the memory and executable by the at least one processor for analyzing a network performance or utilization parameter associated with transmission of the copied packets among a virtual network tap instance, a virtual network packet broker instance located in a first availability zone and a network monitoring tool instance located in a second availability zone separate from the first availability zone, wherein analyzing the performance or utilization parameter associated with transmission of the copied packets includes monitoring or predicting wide area network (WAN) bandwidth utilization by the copied packets between the first and second availability zones, and modifying, based on results of the analyzing, placement of at least one of the virtual network packet broker instance and the virtual network monitoring tool instance, wherein modifying, based on results of the analyzing, placement of one of the virtual network packet broker instance and the virtual network monitoring tool instance includes moving the virtual network packet broker instance so that the virtual network packet broker instance and the virtual network monitoring tool instance are located in the same availability zone, and wherein moving the virtual network packet broker instance includes halting and deallocating resources for the virtual network packet broker instance in the second availability zone and allocating resources for the virtual network packet broker instance in the first availability zone.

16. A system for optimizing placement of virtual network visibility components, the system comprising:
- a virtual network monitoring tap instance for copying packets in a network;
- a virtual network packet broker instance for operating in a first availability zone and receiving and distributing the copied packets to at least one network monitoring tool instance located in a second availability zone separate from the first availability zone; and
- a network visibility component placement controller including at least one processor for analyzing a network performance or utilization parameter associated with transmission of the copied packets among the virtual network tap instance, the virtual network packet broker instance and the network monitoring tool instance, wherein analyzing the performance or utilization parameter associated with transmission of the copied packets includes monitoring or predicting wide area network (WAN) bandwidth utilization by the copied packets between the first and second availability zones, and modifying, based on results of the analyzing, placement of at least one of the virtual network packet broker instance and the virtual network monitoring tool instance, wherein modifying, based on results of the analyzing, placement of one of the virtual network packet broker instance and the virtual network monitoring tool instance includes moving the virtual network monitoring tool instance so that the virtual network packet broker instance and the virtual network monitoring tool instance are located in the same availability zone, and wherein moving the virtual network monitoring tool instance includes halting and deallocating resources for the virtual network monitoring tool instance in the second availability zone and allocating resources for the virtual network monitoring tool instance in the first availability zone.

17. A non-transitory computer readable medium having stored thereon executable instructions that when executed by a processor of a computer control the computer to perform steps comprising:
- providing a virtual network monitoring tap instance for copying packets in a network;
- providing a virtual network packet broker instance for receiving and distributing the copied packets to at least one network monitoring tool instance located in a first availability zone, wherein providing the virtual network packet broker instance includes providing the virtual network packet broker instance in a second availability zone separate from the first availability zone in which the network monitoring tool instance is located;
- analyzing a network performance or utilization parameter associated with transmission of the copied packets among the virtual network tap instance, the virtual network packet broker instance and the network monitoring tool instance, wherein analyzing the performance or utilization parameter associated with transmission of the copied packets includes monitoring or predicting wide area network (WAN) bandwidth utilization by the copied packets between the first and second availability zones; and
- modifying, based on results of the analyzing, placement of at least one of the virtual network packet broker instance and the virtual network monitoring tool instance, wherein modifying, based on results of the analyzing, placement of one of the virtual network packet broker instance and the virtual network monitoring tool instance includes moving the virtual network packet broker instance so that the virtual network packet broker instance and the virtual network monitoring tool instance are located in the same availability zone, and wherein moving the virtual network packet broker instance includes halting and deallocatinq resources for the virtual network packet broker instance in the second availability zone and allocating resources for the virtual network packet broker instance in the first availability zone.

* * * * *